Feb. 20, 1923.
E. R. HUNTLEY.
GOVERNOR FOR SPEED INDICATING MECHANISM.
FILED JAN. 6, 1919.
1,445,687.
3 SHEETS—SHEET 1.
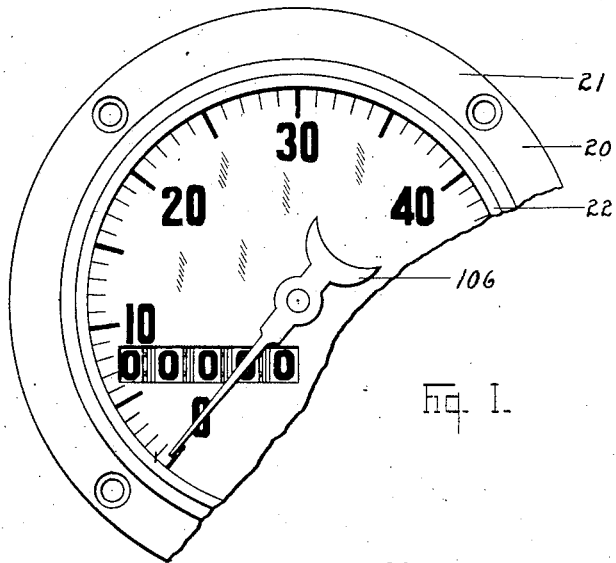
Fig. I.
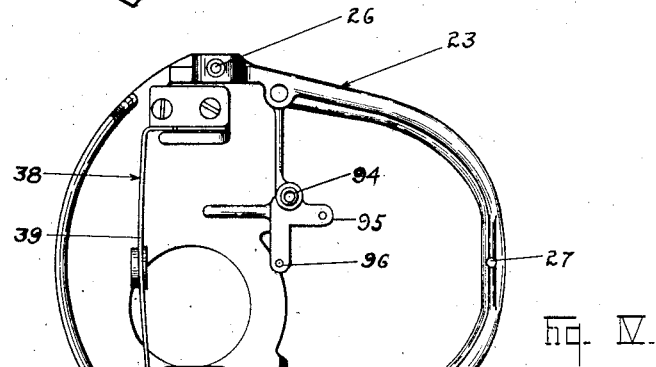
Fig. IV.
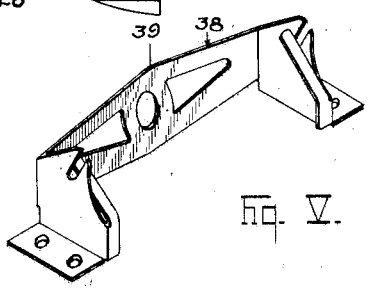
Fig. V.
INVENTOR.
Ernest R. Huntley
BY Chester H. Braselton
ATTORNEY

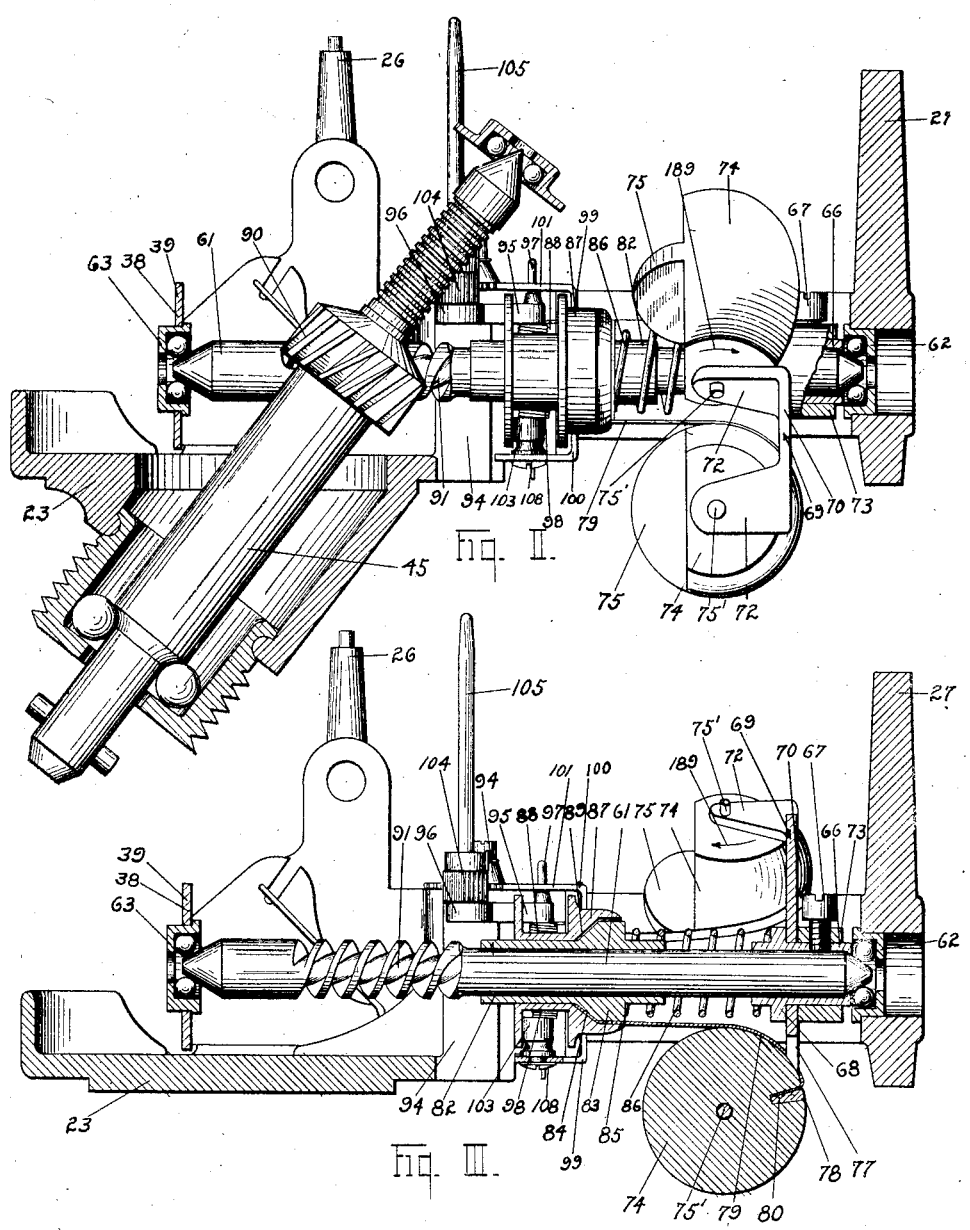

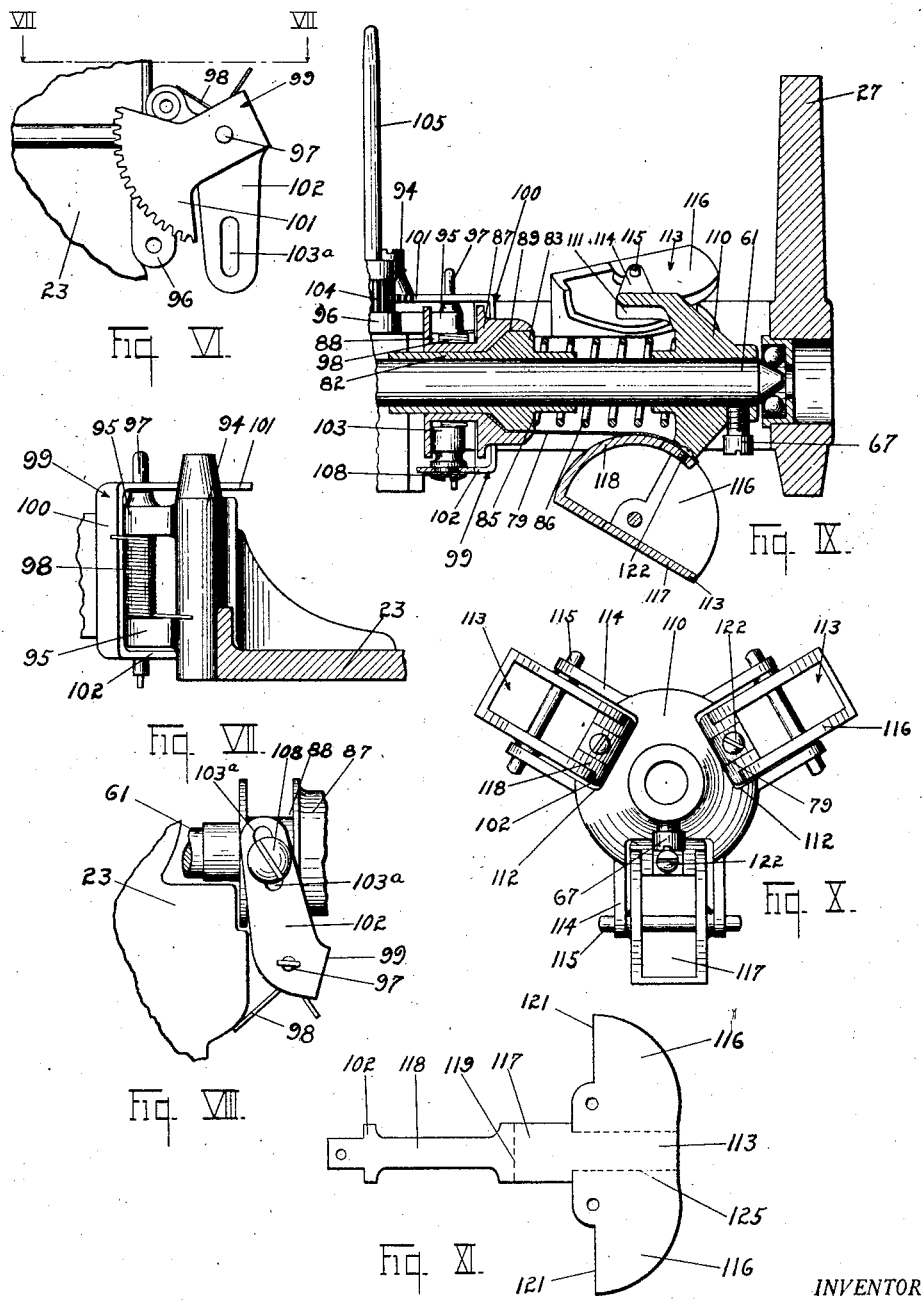

Patented Feb. 20, 1923.

1,445,687

UNITED STATES PATENT OFFICE.

ERNEST R. HUNTLEY, OF TOLEDO, OHIO, ASSIGNOR, BY MESNE ASSIGNMENTS, TO INDUSTRIAL RESEARCH CORPORATION, OF TOLEDO, OHIO, A CORPORATION OF DELAWARE.

GOVERNOR FOR SPEED-INDICATING MECHANISM.

Application filed January 6, 1919. Serial No. 269,880.

*To all whom it may concern:*

Be it known that I, ERNEST R. HUNTLEY, residing at Toledo, county of Lucas, State of Ohio, have invented certain new and useful Improvements in Governors for Speed-Indicating Mechanism, of which I declare the following to be a full, clear, and exact description.

This invention relates to speedometers and more particularly to the speed governor for operating the speed indicating mechanism preferably of the type shown in my co-pending application, filed January 2, 1919, Serial Number 269,339.

The principal object of this invention is to provide a novel governor mechanism for operating the speed indicating mechanism.

Another object of the invention is to construct the operating weights of the governor so that they rotate on their axis to operate the speed indicating mechanism.

Another object of the invention is to provide novel means for supporting one end of a rotating shaft so that the wear of the bearing portions of the shaft will be automatically provided for and looseness between the axis and shaft, due to such wear, eliminated.

With these and incidental objects in view, the invention consists in certain novel features of invention and combination of parts, the essential elements of which are set forth in the appended claims and the certain forms of embodiment of which are hereinafter described with reference to the drawings which accompany and form part of this specification.

Of said drawings:

Fig. I is a front view of a speedometer embodying the present inventiton.

Fig. II is a detail cross-sectional view taken along one side of the speed governor.

Fig. III is a detail sectional view taken longitudinally through the speed governor.

Fig. IV is a front elevation of the frame carrying the various mechanism.

Fig. V is a detail perspective view of a flexible plate carrying a bearing for supporting one end of the governor shaft.

Fig. VI is a detail front view of a portion of the operating connections for the speed indicator hand.

Fig. VII is a detail sectional view taken substantially on the line VII—VII of Fig. VI.

Fig. VIII is a detail rear view of part of the operating connections for the speed indicating hand.

Fig. IX is a longitudinal section taken through a speed governor of modified form.

Fig. X is detail end view of the governor shown in Fig. IX.

Fig. XI is a detail view showing a blank which is bent to form one of the weight members of the governor shown in Figs. IX and X.

Referring to Fig. I of the drawings, the speedometer is mounted in a casing 20 having a flange 21 by which it is secured to the instrument board or other suitable part of the vehicle. A glass front is carried in a ring 22 positioned in any desired manner in the front opening of the casing so that the registrations on the speed indicating mechanism and odometer may be viewed.

A supporting frame 23 (Fig. IV) is of skeleton form and has three arms 26, 27 and 28 on the outer ends of which is mounted the dial having on its face the usual speed graduated scale.

The speed indicating mechanism and odometer are operated by an operating shaft 45, which is arranged obliquely to the plane of the frame 23 and is supported at opposite ends by anti-friction bearings carried by the frame.

The governor shaft 61 (Figs. II and III) has conical ends and its right-hand end is supported by ball bearings mounted in a bearing cup 62 supported in an opening in the frame 23. The left hand end of the shaft 61 is supported by ball bearings mounted in a bearing cup 63 which is positioned in an opening in the center of the central portion 39 of the member 38 (Figs. IV and V). The portion 39 of the member 38 is flexible and the member 38 is so mounted in respect to the shaft 61 that the portion 39 is slightly bowed to press the bearings firmly against the end of the shaft. It is obvious that with this form of supporting means the wear of the shaft at the bearings is automatically taken care of as the portion 39 is constantly tending to straighten out. This form of mounting prevents the shaft from becoming loose in the bearings and therefore eliminates all noise which would accompany such looseness.

The governor mounted on the shaft 61 is of novel construction and will now be described. Mounted on the shaft 61, near its right hand end as viewed in Fig. III, is a collar 66 rigidly secured to the shaft by a screw 67. The collar 66 is provided with a flange 68 and secured on the collar 66 is a frame 69 consisting of a plate portion 70 having three pairs of laterally extending arms 72. The screw 67 retains a collar 73 on the sleeve 66 and the plate portion 70 is gripped firmly between the flange 68 and the collar 73 so that the frame 69 rotates with the collars and shaft 61. Mounted between each pair of arms is a barrel shaped weight 74 which is cut away on one side of its axis the cut-away portions leaving a circular projection 75. Each weight 74 is supported on a rod 75′ projecting axially through its center, the ends of the rod being loosely mounted in the arms 72 of the corresponding pair to permit rotatiton of the weight about its geometric axis. The plate portion 70 is cut away at 77 (Fig. III) to accommodate the weights 74. A groove 78 is cut in each weight, and one end of a ribbon 79, which is formed of flexible metal or other suitable material, is fastened in the groove by means of a wedge 80.

A sleeve 82 is loose on the shaft 61 and is enlarged at 83 to provide a conical surface 84 on one side and a shoulder 85 on the other. A coiled spring 86 is compressed between the shoulder 85 of the sleeve 82 and the lateral flange 68 of the sleeve 66, and hence tends to move the sleeve 82 axially toward the left. Fast on the sleeve 82 is a collar 87 provided with an annular groove 88 and an enlarged opening in its right-hand end to form an interior conical surface 89. The left hand ends of the ribbon 79 are firmly gripped between the conical surfaces 84 and 89 of the collar 82 and sleeve 87 respectively to fasten these ends of the ribbons to the sleeve 82.

Fast on the shaft 45 is a worm gear 90 meshing with a worm 91 cut in the governor shaft 61 so that the shaft 45 rotates the governor shaft.

From the above description it can be seen that as each weight 74 is cut away on one side, the opposite side is heavier and therefore when the frame 79 is rotated the weights 74 rotate, as the centrifugal action causes the heavier sides of the weights to move outwardly away from the shaft 61. Normally, when the shaft 61 is not rotating the spring 86 retains the sleeve 82 in the position shown in Figs. II and III and through the ribbons 79, which are flexible, cause the weights to assume the positions shown in these figures. The ribbons 79 are sufficiently stiff to prevent the weights from rotating in the direction of the arrow 189 past normal position. When the shaft 61 is rotated the weights 74 rotate about their axis because of the centrifugal action and moves the sleeve 82 toward the right against the action of the spring 86, the extent of movement of the sleeve 82 being dependent upon the speed of rotation.

The frame 23 is provided with an arm 94 having two laterally extending and aligned lugs 95 and one laterally extending lug 96. Projecting through the lugs 95 is a pin 97 (Fig. VII) and coiled about the pin 97 and between the lugs 95 is a spring 98. Mounted on the pin 97 is a U-shaped operating member 99 comprising a central portion 100, an arm 101 (Fig. VI) forming a segmental gear and an arm 102 provided with a slot 103ᴬ. One end of the spring 98 engages the portion 100 and the other end engages the arm 94 thereby normally retaining one edge of the arm 101 in engagement with the arm 94. Mounted on the arm 102 of the member 99 is a stud 103 (Figs. II and III) projecting into the groove 88 in the sleeve 87. The teeth or segmental arm 101 mesh with a pinion 104 fast on a shaft 105 which at its upper end carries the indicating hand 106 (Fig. I), the lower end of the shaft 105 being mounted for rotating in an opening in the lug 96 on the arm 94 of the frame 23.

From this description it can be seen that movement of the sleeve 87 by the governor rotates the member 99 to corresponding extents as the stud 103 extends into the groove 88 in the the sleeve 87. This rotation of the member 99 is communicated to the indicating hand through the segmental arm 101, gear 104 and shaft 105 so that the indicating hand is moved over the scale on the dial to indicate the speed of the vehicle.

As shown in Figs. III and VIII the stud 103 is secured on the arm 102 by a screw 108 which projects through the slot 103ᴬ in the arm, the screw being adapted to be moved in the slot to make the proper adjustments and provide for wear.

In the modification of the speed governor shown in Figs. IX and X and XI, a frame 110 is fast on the governor shaft 61 and is provided with an axially extending flange 111 between which are openings 112 (Fig. X) to accommodate the weights 113. Projecting from each flange 111 is a pair of arms 114, a pin 115 being supported on the arms of each pair for carrying the weight 113. Each of these weights 113 is formed preferably from a sheet metal blank (Fig. XI) the side portions 116 of the weights are bent on the lines 125 at right angles to the center portion 117 of the blank and then the arm portion 118 is bent approximately on the line 119 and curved as shown in Fig. IX. The shoulders 102 on the arm 118 engage the edges, indicated by the reference numeral 121, and the portion of the arm beyond the shoulders projects between the sides 116. The right hand ends of the ribbons 79 are secured by screws 122 to the end of the arm 118. The remainder of the governor mechanism shown in this modification is substantially the same as that shown in the preferred form. It is obvious that the operation of this modified form is the same as that described in connection with the preferred form.

While the form of mechanism herein shown and described is admirably adapted to fulfill the objects primarily stated, it is to be understood that it is not intended to confine the invention to the forms of embodiment herein described, for it is susceptible of embodiment in various forms all coming within the scope of the claims which follow.

Having thus described my invention, what I desire to secure by Letters Patent of the United States and claim is:

1. In a device of the class described, the combination of a shaft, a sleeve slidable on the shaft, and having a conical surface, a collar fast on said sleeve and having a conical interior surface, ribbons having their one end gripped between said conical surfaces on said sleeve and collar, and outwardly movable means connected to the other end of said ribbons arranged to pull upon said ribbons as the speed of rotation of the shaft increases.

2. In a device of the class described, the combination of a shaft, a frame fixed upon the shaft, weights pivoted on said frame and having one side cut away to leave a circular projection, ribbons secured to said weights and adapted to engage said circular projections, an element movable axially of said shaft and attached to the opposite ends of said ribbons.

3. In a device of the class described, the combination of a rotatable shaft, a frame fixed on the shaft and rotatable therewith, circular weights having one side cut away, and means for pivotally mounting the weights on their geometric axes on the frame, an element movable axially of the shaft and flexible connections attached to said element and said weights and adapted to be wound upon the latter as they turn on their axes.

4. In a device of the class described, the combination of a shaft, a frame fixed upon the shaft, circular weights pivoted on the frame having one side cut away, a sleeve slidable on said shaft, and ribbons connecting said sleeve and said weights, and adapted to be wound upon the weights as they turn on their axes.

5. In a device of the class described, the combination of a shaft, a frame fixed upon the shaft, weights pivoted on said frame, and having more weight on one side of their pivotal axes than on the other, means slidably mounted on the shaft, and ribbons connecting said means to the weights the ribbons being sufficiently stiff to prevent the heaviest side of the weights from moving past normal position toward the shaft.

6. In a device of the class described, the combination of a shaft, a frame fixed upon the shaft, a sleeve slidable thereon, circular weights having one side cut away so that the opposite side is the heaviest, a circular projection extending from the cut away side of each weight, means for pivoting the weights on the frame, ribbons each connected at one end to the sleeve and at the other end to one of the weights, said ribbons being adapted to engage the circular projections on the weights and being sufficiently stiff to prevent the heaviest side of the weights from moving past normal position toward the shaft.

7. In a device of the class described, the combination of a shaft, means slidably mounted on said shaft, a frame fixed on said shaft, circular unbalanced weights pivoted on said frame and flexible metal ribbons connected at one end to the peripheries of said weights and at their opposite ends to said slidable means.

8. In combination, a rotatable frame, unbalanced weights having circular peripheries, said weights being pivoted to said frame, ribbons secured to the peripheries of said weights and adapted to be wound thereon as the speed of rotation of the frame increases, and an element rotatable about the axis of rotation of said frame, said element being secured to the opposite ends of said ribbons and being longitudinally movable thereby.

9. In combination, a rotatable frame, unbalanced weights pivoted on said frame, the lighter sides of the weights having circular peripheries, ribbons secured to said weights adapted to be wound upon said circular peripheries as the speed of rotation of the frames increases, and an element rotatable about the axis of rotation of said frame, said element being secured to the opposite ends of said ribbons and being longitudinally movable thereby.

In testimony whereof, I affix my signature.

ERNEST R. HUNTLEY.